(12) United States Patent
Hirakawa et al.

(10) Patent No.: US 8,488,166 B2
(45) Date of Patent: Jul. 16, 2013

(54) PRINTING SYSTEM, PRINTING DEVICE, PROGRAM AND STORAGE MEDIUM

(75) Inventors: Takahiro Hirakawa, Kanagawa (JP); Masaaki Igarashi, Saitama (JP); Hozumi Yonezawa, Tokyo (JP); Hiroshi Gotoh, Tokyo (JP); Takeshi Yoshizumi, Tokyo (JP); Kohji Yamamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 317 days.

(21) Appl. No.: 12/878,639

(22) Filed: Sep. 9, 2010

(65) Prior Publication Data

US 2011/0063665 A1 Mar. 17, 2011

(30) Foreign Application Priority Data

Sep. 15, 2009 (JP) ................................ 2009-213413
Jul. 6, 2010 (JP) ................................ 2010-154250

(51) Int. Cl.
*G06F 3/12* (2006.01)
(52) U.S. Cl.
USPC .................... 358/1.15; 358/1.13; 358/1.14
(58) Field of Classification Search
None
See application file for complete search history.

(56) References Cited

U.S. PATENT DOCUMENTS

| | | | |
|---|---|---|---|
| 2002/0027673 A1 | 3/2002 | Roosen et al. | |
| 2002/0063884 A1* | 5/2002 | Bhogal et al. | 358/1.15 |
| 2007/0189827 A1* | 8/2007 | Lermant et al. | 400/76 |
| 2009/0091783 A1* | 4/2009 | Kazume et al. | 358/1.15 |

FOREIGN PATENT DOCUMENTS

| | | |
|---|---|---|
| CN | 101403960 | 4/2009 |
| EP | 0 851 341 A1 | 7/1998 |
| JP | 2002-189581 | 7/2002 |
| JP | 2007-272832 | 10/2007 |
| JP | 2007-272833 | 10/2007 |
| JP | 2009-69948 | 4/2009 |
| JP | 2009-101679 | 5/2009 |
| JP | 2009-104581 | 5/2009 |
| JP | 2009-104582 | 5/2009 |

(Continued)

OTHER PUBLICATIONS

Extended European Search Report issued Jan. 31, 2013 in Patent Application No. 10175002.4.

(Continued)

*Primary Examiner* — Marivelisse Santiago Cordero
*Assistant Examiner* — Huo Long Chen
(74) *Attorney, Agent, or Firm* — Oblon, Spivak, McClelland, Maier & Neustadt, L.L.P.

(57) ABSTRACT

A printing system including a plurality of host devices and a plurality of printing devices connected. The printing system includes: a storage unit; a first storage processing unit for storing, in the storage unit, a print status of a print job; an information updating unit for monitoring the plurality of printing devices and updates the execution status identification information stored in the storage unit; and a job management unit for determining, based on the print status, whether the print job is to be executed on the one printing device. When a processing request for the print job is sent from another host device while the printing process for the print job sent from the one host device is suspended in the one printing device, the job management unit allows the one printing device to execute the print job sent from the another host device.

7 Claims, 12 Drawing Sheets

FOREIGN PATENT DOCUMENTS

| | | |
|---|---|---|
| JP | 2009-104583 | 5/2009 |
| JP | 2009-214321 | 9/2009 |
| JP | 2009-217467 | 9/2009 |
| JP | 2009-238206 | 10/2009 |
| JP | 2009-297994 | 12/2009 |
| JP | 2009-301135 | 12/2009 |

OTHER PUBLICATIONS

Chinese Office Action dated Mar. 6, 2013, with Translation of relevant portions, for Chinese Application No. 2010102799881 filed Sep. 8, 2010 in the State Intellectual Property Office of P.R. China.

* cited by examiner

| FIG. 7A |
| FIG. 7B |

PRINTING SYSTEM, PRINTING DEVICE, PROGRAM AND STORAGE MEDIUM

CROSS-REFERENCE TO RELATED APPLICATIONS

The present application claims priority to and incorporates by reference the entire contents of Japanese Patent Application No. 2009-213413 filed in Japan on Sep. 15, 2009 and Japanese Patent Application No. 2010-154250 filed in Japan on Jul. 6, 2010.

BACKGROUND OF THE INVENTION

1. Field of the Invention

The present invention relates to a printing system, a printing device, a program, and a storage medium.

2. Description of the Related Art

In conventional printing systems, a plurality of printing devices are connected to host devices via telecommunication lines disclosed in a known printing system (Japanese Patent Application Laid-open No. 2002-189581), where in a case when a printing error occurs in one printing device on which a printing process is being executed so as to cause the printing process to fail, the printing process is to be executed on another printing device. In some printing systems of this type, printing devices can execute print jobs sent from a plurality of host devices.

In such conventional printing systems, when a communication failure occurs between a host device and a printing device, the print job from the host device is suspended until the communication failure is recovered.

While the print job is suspended, a processing request for a print job may be sent to this printing device from another host device. In such a case, even though the communication status between this host device and the printing device and the conditions of the printing device itself are good and therefore the new print job is executable on the printing device, the new print job is not executed and is queued until the communication failure is recovered.

SUMMARY OF THE INVENTION

It is an object of the present invention to at least partially solve the problems in the conventional technology.

According to one aspect of the present invention, there is provided a printing system including a plurality of host devices and a plurality of printing devices which are connected via telecommunication lines, the printing system for executing a printing process for a print job sent from any one of the plurality of host devices on any one of the plurality of printing devices, the print job including print data and a processing command, the printing system including: a storage unit; a first storage processing unit for storing, in the storage unit, a print status of the print job, the print status including execution status identification information that indicates at least whether a printing process is suspended in the one printing device; an information updating unit for monitoring the plurality of printing devices and updates the execution status identification information stored in the storage unit; and a job management unit for determining, when a processing request for the print job sent from the one host device is received, based on the print status, whether the print job is to be executed on the one printing device, wherein when a processing request for the print job is sent from another host device while the printing process for the print job sent from the one host device is suspended in the one printing device, the job management unit allows the one printing device to execute the print job sent from the another host device.

According to another aspect of the present invention, there is provided a printing device included in the printing system, the printing device including: the first storage processing unit, the information updating unit, the job management unit, and a print processing unit for executing the print job.

According to still another aspect of the present invention, there is provided a program for causing a computer to function as the first storage processing unit, the information updating unit, and the job management unit of the printing system.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
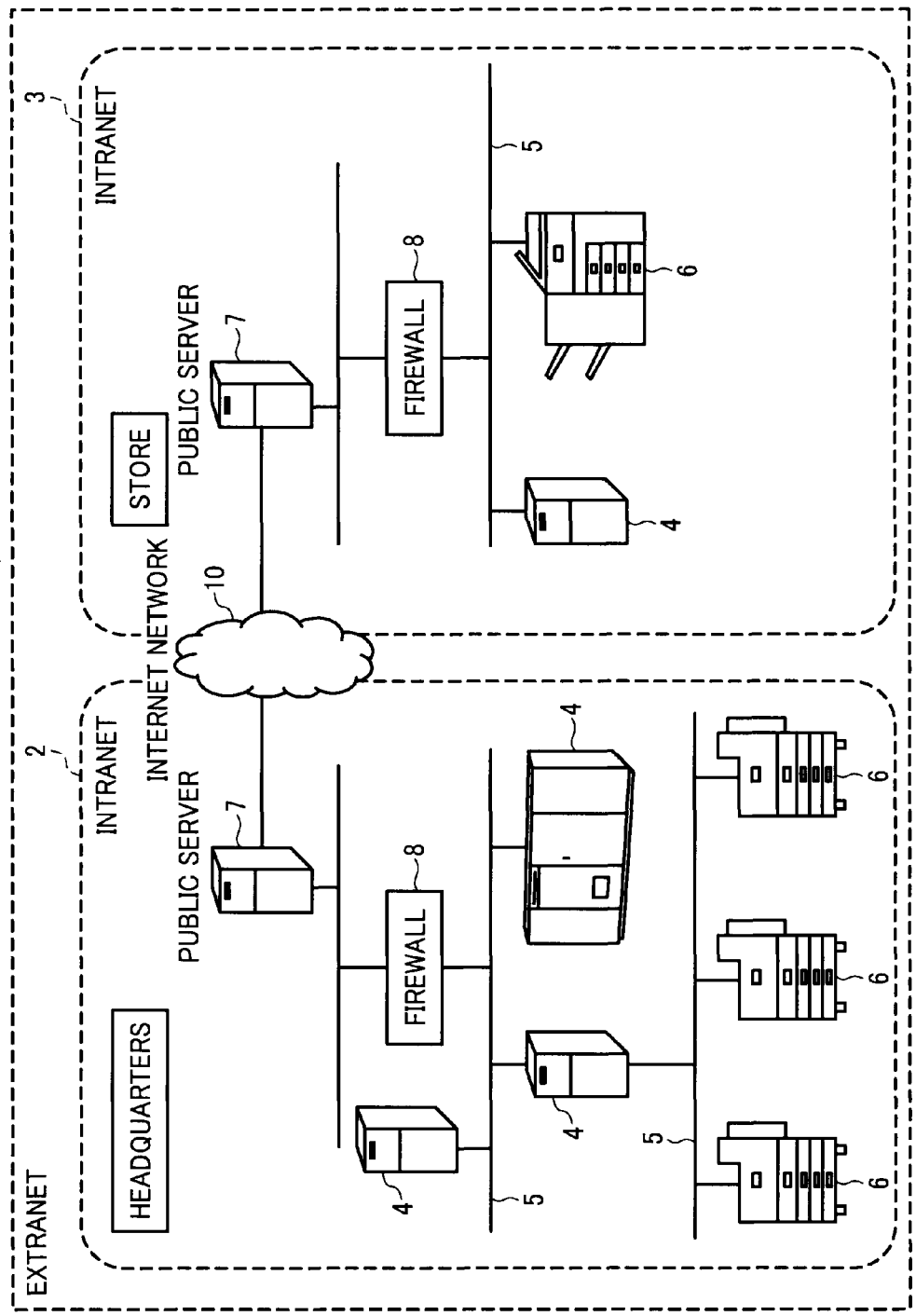
FIG. 1 is a schematic diagram illustrating an example of the general configuration of a printing system according to an embodiment of the present invention.

Hereinafter, preferred embodiments of the present invention will be described in detail with reference to the drawings. In the following preferred embodiments, similar components are used. Accordingly, these components are denoted by the same reference numerals hereinafter, and a redundant description is omitted.

First Embodiment

Configuration of Printing System

As shown in FIG. 1, a printing system 1 according to the present embodiment is configured as an extranet in which intranets 2 and 3 of a plurality of companies or business establishments, which are company networks based on the internet technology, are mutually connected through an internet network 10.

The intranet 2, for example, an intranet of the headquarters of a convenience store chain, is configured as a server-client system in which a plurality of clients 6, such as computers and printers, are connected to various server computers (hereinafter denoted as servers) 4 through a network (telecommunication line) 5 such as a LAN (Local Area Network). In the intranet 2, a firewall 8 is provided at the boundary between the internet network (telecommunication line) 10 and the intra-company network 5 except for a public server 7 such as a WWW (World Wide Web) server. The firewall 8 monitors packets exchanged between the intra-company network 5 and the internet network 10. Each packet is allowed to pass through the firewall 8 or blocked (discarded) according to predetermined rules to ensure security in the intra-company network 5.

The intranet 3, for example, an intranet of a franchise store, is also configured as a server-client system in which a plurality of clients 6, such as computers and printers, are connected to various servers 4 through a network 5 such as a LAN. Also in the intranet 3, a firewall 8 is provided at the boundary between the internet network 10 and the intra-company network 5 except for a public server 7.

The intranets 2 and 3 may not be connected through the internet network 10 but may be connected through a dedicated communication line. At least a part of each network 5 may be connected via wireless (such as infrared or radio frequency) connections. Optical fibers may also be used.

Figure 2:
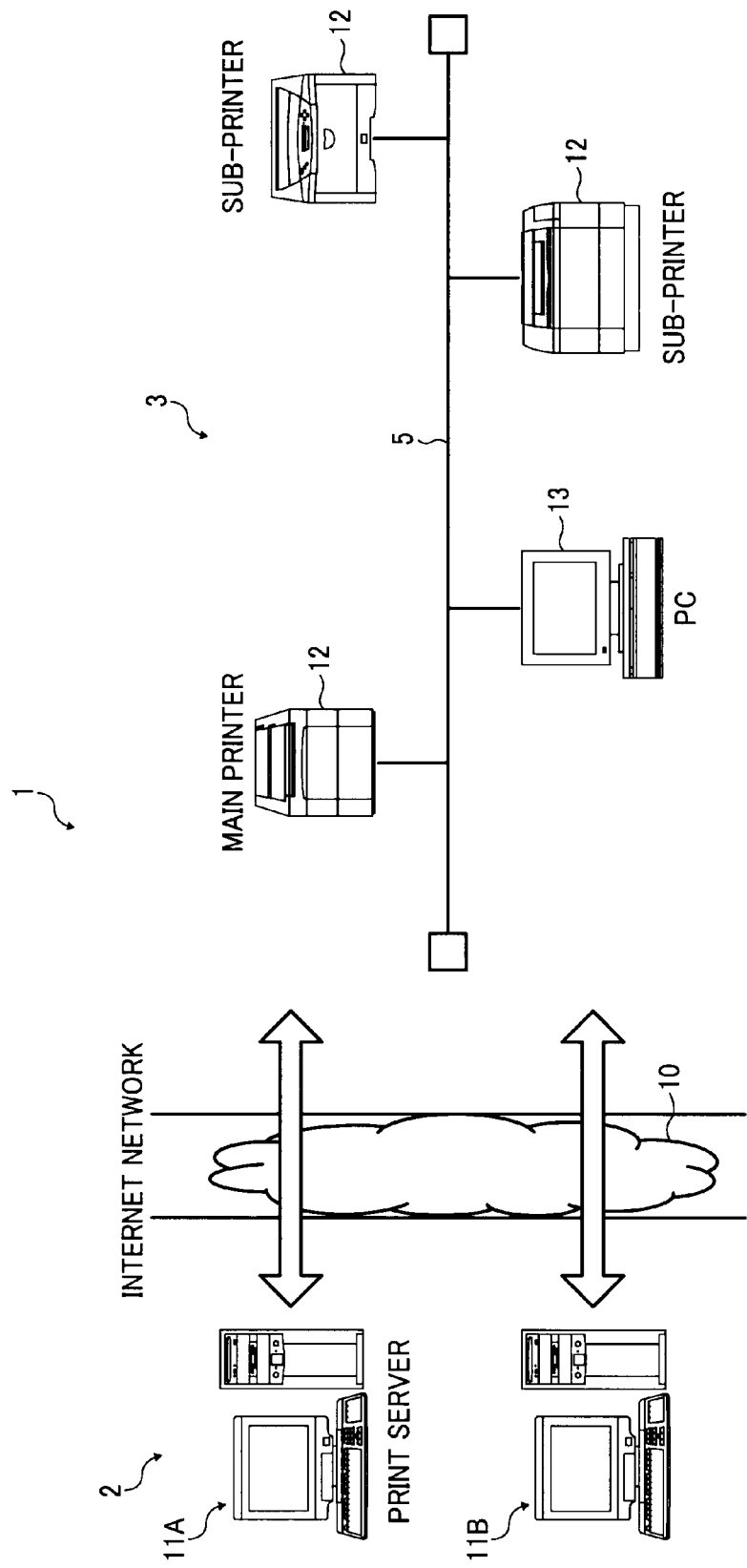
FIG. 2 is a schematic diagram illustrating an example of the configuration of a part of the printing system.

As shown in FIG. 2, the printing system 1 is configured such that a print server (host device) 11, which is one of the servers 4 included in the intranet 2 of, for example, the headquarters of a convenience store chain, can execute a printing process (for example, a process for printing sales promotion materials) directly on a printer (printing device) 12, which is one of the clients 6 included in the intranet 3 of a franchise store. The intranet 3 includes a plurality of printers 12 having the same functions and a personal computer 13, as shown in FIG. 2. Three printers 12 are connected to the intranet 3; a top-level main printer 12 and lower-level sub-printers 12 are connected through the network 5. In the present embodiment, a plurality of print servers 11 (11A and 11B) are connected.

In the printing system 1 according to the present embodiment, print jobs are normally processed sequentially, but parallel processing is not performed. More specifically, under normal circumstances, only one print job is processed at once, and a plurality of print jobs are not processed in parallel. Print jobs are executed on one of the plurality of printers 12, and the other printers 12 are used as back-up printers 12 on standby. A print job is processed page-by-page. For example, each time one page is outputted and printed, the print status is updated on the printer 12 used, and a notification is sent from this printer 12 to the requester print server 11. Since the reliability is improved in the manner described above, the printing system 1 according to the present embodiment is particularly suitable for a document printing system for printing a large number of documents.

In the printing system 1 according to the present embodiment, when a communication failure occurs for some reason during execution of a print job sent from one print server 11 to the printer 12 and the transmission of data for the print job is interrupted, the printer 12 can accept and process print jobs from the other print servers 11. The efficiency of print processing is thereby improved. Next, the configuration of each part of the printing system 1 that achieves the above function will be described.

Configuration of Print Servers

Figure 3:
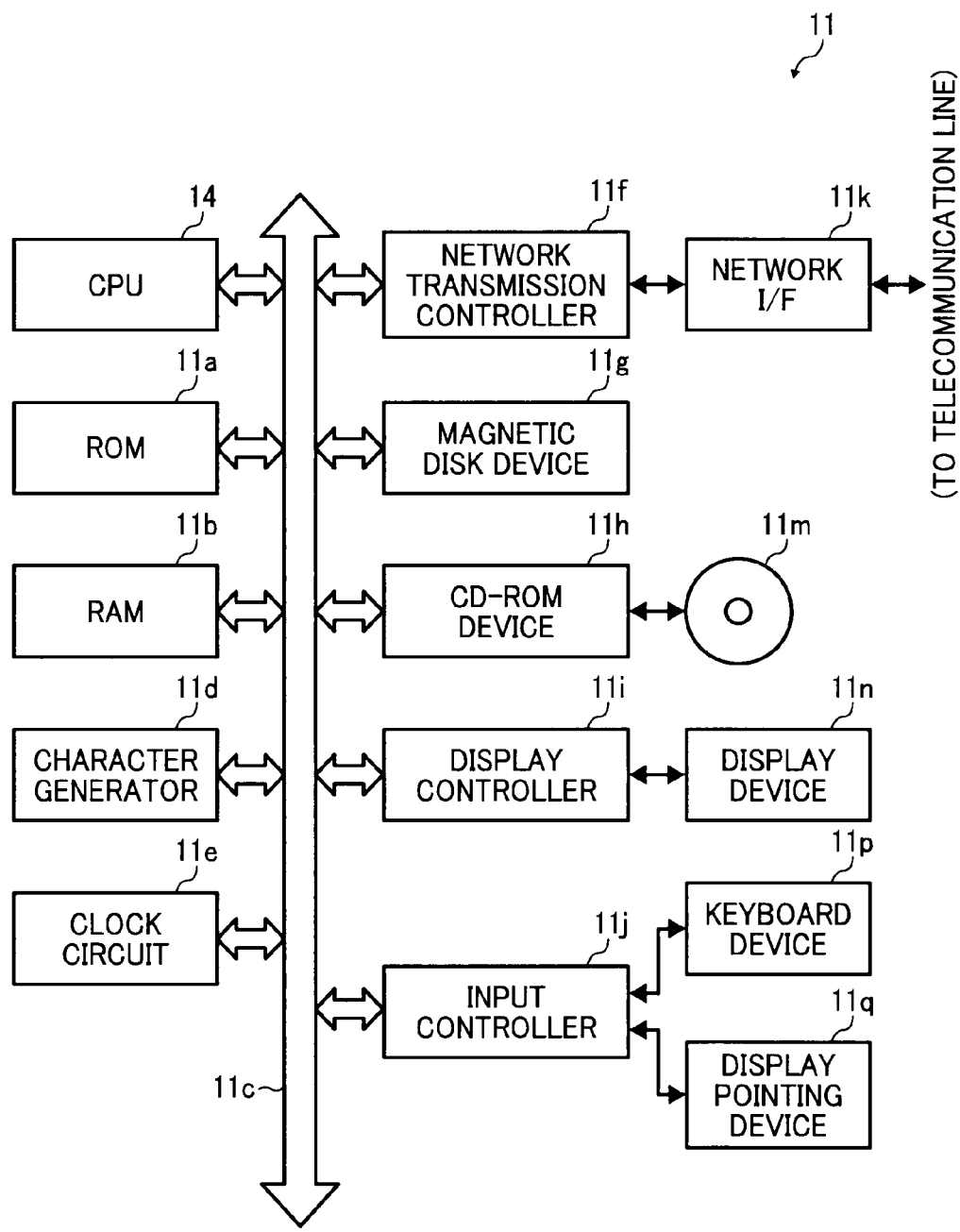
FIG. 3 is a block diagram illustrating an example of the configuration of a print server.

As shown in FIG. 3, each of the print servers 11 includes a CPU (Central Processing Unit) 14 for controlling the operation of the print server 11. A ROM (Read Only Memory) 11*a* that stores necessary data and programs to be executed by the CPU 14 on startup and other data and programs and a RAM (Random Access Memory) 11*b* that includes a work area for the CPU 14 and other areas are connected to the CPU 14 via an internal bus 11*c*.

A character generator 11*d*, a clock circuit 11*e*, a network transmission controller 11*f*, a magnetic disk device 11*g*, a CD-ROM device 11*h*, a display controller 11*i*, and an input controller 11*j* are also connected to the CPU 14 via the internal bus 11*c*. Data is exchanged between these components mainly via the internal bus 11*c*.

The character generator 11*d* generates data for displaying graphic characters. The clock circuit 11*e* outputs current date and time information.

The network transmission controller 11*f* executes processes for controlling communication according to various predetermined network protocol suites for exchanging data with other servers 4 and clients 6 via a network interface 11*k* and the network 5. The network interface 11*k* is connected to printers 12, which are clients 6 in another intranet (the intranet 3 in the present embodiment), via the network 5 and the internet network 10. The network interface 11*k* sends print data and other data to the printers 12 and receives print processing status and other information from the printers 12.

The magnetic disk device 11*g* stores an OS (Operating System), various application programs that run on the OS, and various types of data such as work data, file data, and image information data. In the present embodiment, a print data transmission program and other programs are stored as the application programs. The CD-ROM device 11*h* reads data (various application programs and various types of data such as work data, file data, and image information data) stored on a CD-ROM 11*m*, which is an exchangeable storage medium.

In the above print server 11, when a user turns on the power, the CPU 14 starts executing a loader (program) in the ROM 11*a* to read the OS from the magnetic disk device 11*g* into the RAM 11*b*, and the OS is thereby booted. The booted OS starts executing application programs, reads information, and stores information, in response to the operation of the user. The storage medium is not limited to the CD-ROM 11*m* and may be any computer-readable storage medium such as a flexible disk (FD), a CR-R, a CD-RW, a DVD, or semiconductor memory. If a different storage medium is used, the CD-ROM device 11*h* is, of course, replaced with a device that can read data on the corresponding storage medium. The application programs are not limited to those that can run on the given OS. These application programs may be programs that cause the OS to execute parts of various processes described later or may be included as parts of a set of program files that constitute predetermined application software, the OS, etc.

Generally, the application programs to be installed on the magnetic disk device 11*g* of the print server 11 are recorded on storage mediums such as CD-ROMs 11*m*, and the application programs recorded on the storage mediums are installed on the magnetic disk device 11*g*. Therefore, any portable storage medium such as a CD-ROM 11*m* can be a storage medium for storing the application programs. The application programs may be acquired from outside sources via the network interface 11k and installed on the magnetic disk device 11g.

The display controller 11i controls a display device 11n such as a CRT display to display, for example, characters and images corresponding to display data received from the CPU 14 on the display device 11n. The input controller 11j receives input signals in response to the key operation in a keyboard device lip and input signals in response to the operation of a display pointing device 11q such as a mouse or a pointer and notifies the CPU 14 of the input signals.

Information of a document to be printed is stored in the print server 11 in any of the following exemplary manners; document information is created by an appropriate application program executed on the print server 11 and is then stored on the magnetic disk device 11g; document information stored on the CD-ROM 11m is read by the CD-ROM device 11h and then stored in the print server 11; and document information is reconstructed from information received by, for example, electronic mail via the network 5 and the internet network 10 and is then stored in the print server 11.

Configuration of Printers

Figure 4:
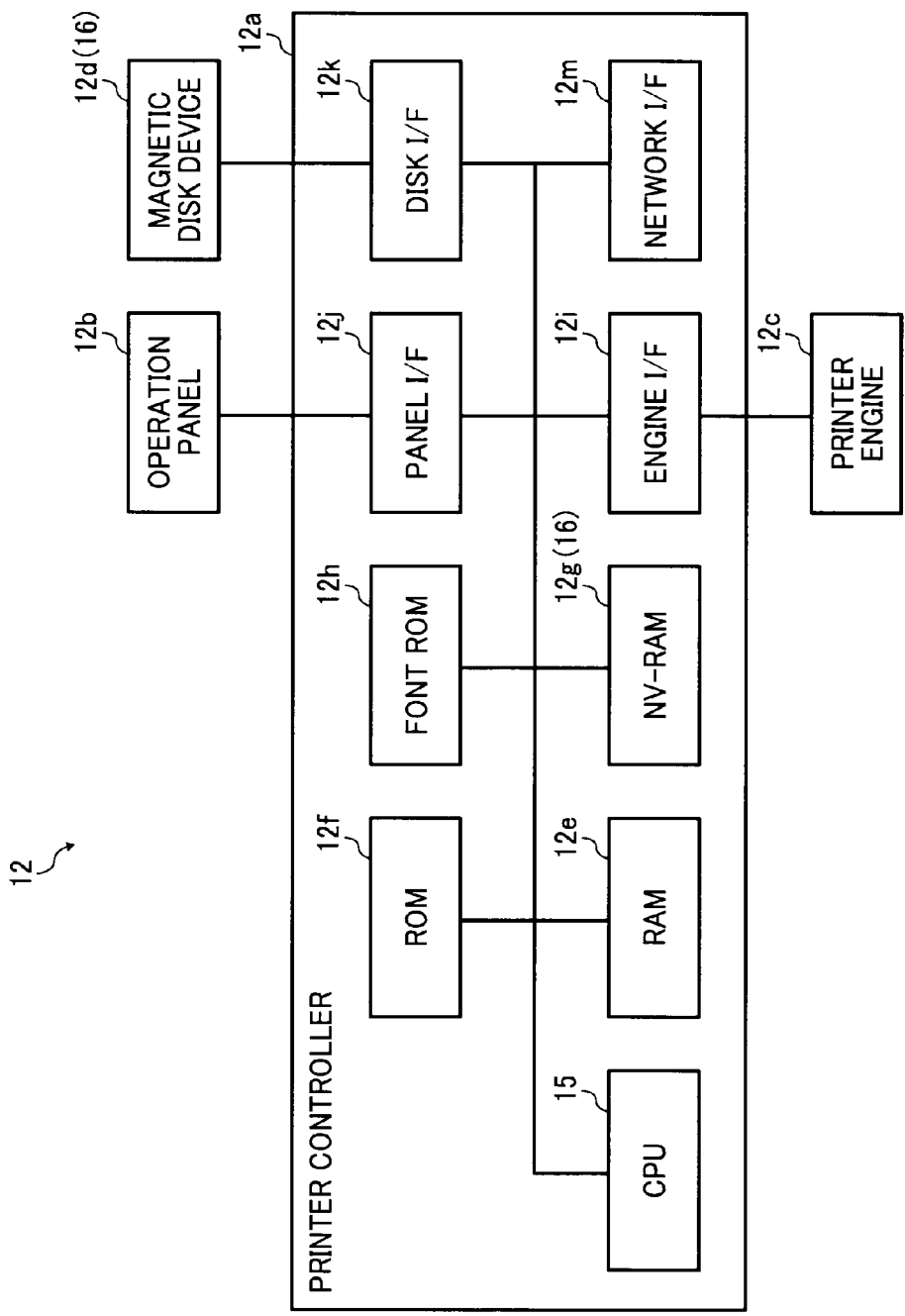
FIG. 4 is a block diagram illustrating an example of the hardware configuration of a printing device.

As shown in FIG. 4, each of the printers 12 includes a printer controller (motherboard) 12a that executes processes for controlling components of the printer 12 and various control processes such as image forming processing. An operation panel 12b, a printer engine 12c, and a magnetic disk device 12d are connected to the printer controller 12a.

The printer controller 12a is a general term of a control mechanism for converting print data from any of the servers 4 in the intranets 2 and 3 (for example, a print server 11 in the intranet 2) to drawing data according to the currently set control mode and a control code from the server 4 and then outputting the converted drawing data to the printer engine 12c. The printer controller 12a is composed of the following modules including: a CPU 15 which is a main controlling component; a RAM 12e; a ROM 12f for storing various types of information specific to the printer 12; an NV-RAM 12g which is a non-volatile memory that can retain stored data regardless of the ON-OFF state of a power source; a font ROM 12h which is a memory that stores several types of fonts used for printing; an engine interface 12i; a panel interface 12j to which the operation panel 12b is connected; a disk interface 12k to which the magnetic disk device 12d is connected; a network interface 12m; and other devices.

The operation panel 12b is a switch unit through which the status display, mode, and print conditions of the printer 12 can be changed.

The printer engine 12c forms an image through an electrophotographic process and then outputs and records the image onto a recording paper sheet. More specifically, the printer engine 12c electrostatically forms an image on a photosensitive body (not shown) based on the drawing data and control information from the printer controller 12a and transfers the formed image onto a transfer paper sheet fed from a paper feeder (not shown).

The magnetic disk device 12d stores various types of information of a document to be printed and other various appropriate information files. Various application programs that run on the OS (Operating System) are stored on the magnetic disk device 12d. In the present embodiment, a print processing program and other programs are stored as the application programs.

The RAM 12e is used as a work area for the CPU 15, a buffer for receiving data from any of the servers 4 in the intranets 2 and 3, and an image development area for the processed data.

The engine interface 12i is an interface for receiving-sending control signals from the printer controller 12a to the printer engine 12c, status signals from the printer engine 12c to the printer controller 12a, and other signals.

The network interface 12m is an interface for receiving and sending control signals and data from any of the servers 4 in the intranets 2 and 3 (for example, a print server 11) to the printer 12 via the network(s) 5 and status signals from the printer 12, and other signals.

In the printer 12 configured as above, as in the servers 4, when a user turns on the power, an OS is read from the magnetic disk device 12d into the RAM 12e, and the read OS is booted. The booted OS starts executing application programs, reads information, and stores information, in response to the operation of the user. The application programs are not limited to those that can run on the given OS. These application programs may be programs that cause the OS to execute parts of various processes described later or may be included as parts of a set of program files that constitute predetermined application software, the OS, etc.

Generally, the application programs to be installed on the magnetic disk device 12d of the printer 12 are recorded on storage mediums (not shown) such as CD-ROMs, and the application programs recorded on the storage mediums are installed on the magnetic disk device 12d. Therefore, any portable storage medium such as a CD-ROM can be a storage medium for storing the application programs. The application programs may be acquired from outside sources via the network interface 12m and be installed on the magnetic disk device 12d.

In the present embodiment, the application programs, the OS, etc. are stored in the magnetic disk device 12d. Alternatively, these may be stored in any computer-readable storage medium such as a semiconductor memory.

Figure 5:
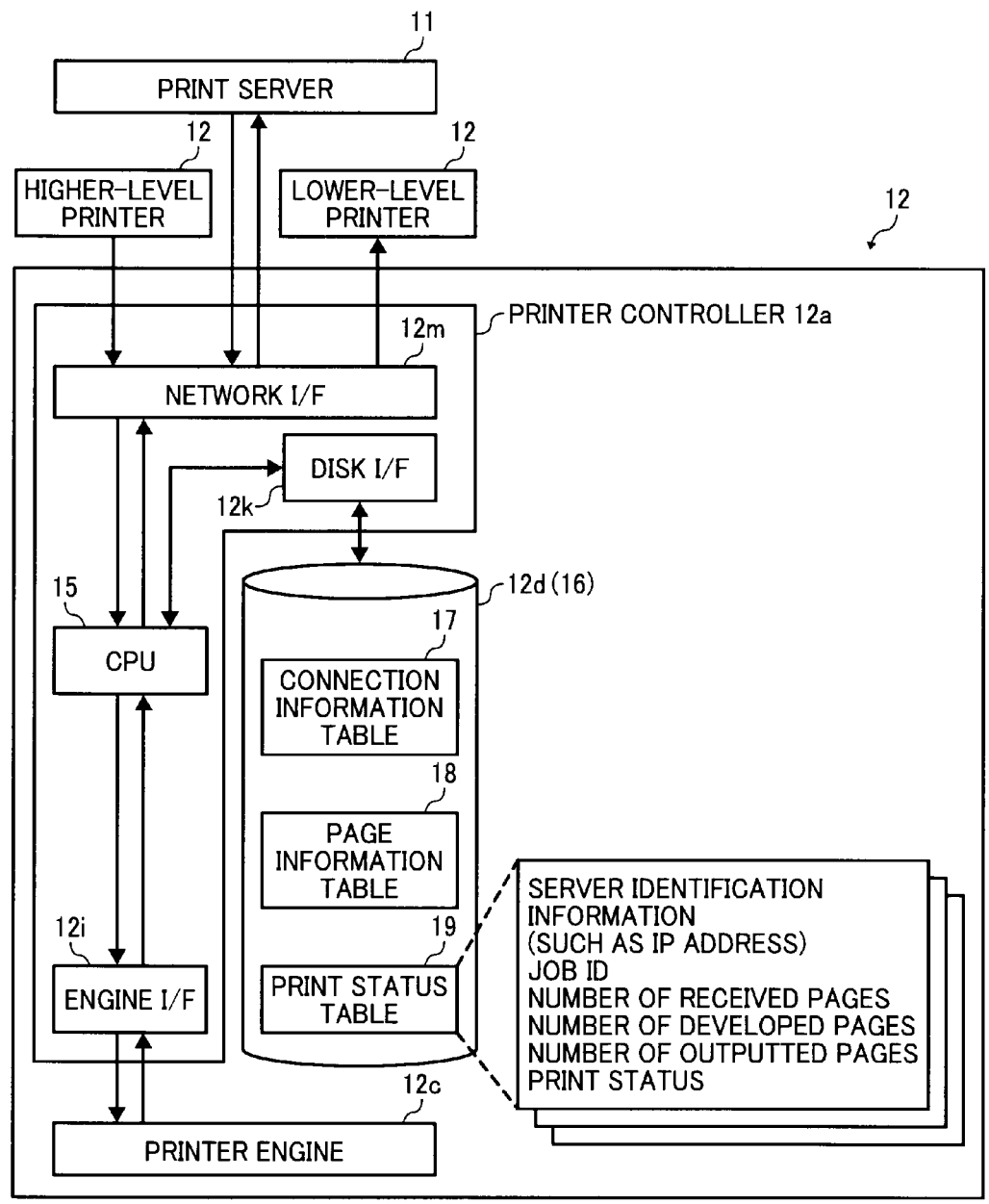
FIG. 5 is a block diagram illustrating an example of the configuration of the printing device.

In the magnetic disk device 12d, information tables such as a connection information table 17, a page information table 18, and a print status table 19 are stored as shown in FIG. 5. The information included in each of the tables 17, 18, and 19 is used in a printing process, a printing switching process for changing the printer 12 used to execute the printing process (a process for changing job assignment), and a process for determining whether a print job is to be executed on a printer 12, and other processes. The connection information table 17 includes information of printers 12 that is required to execute the printing switching process, for example, the number of printers 12 in a group used for the switching process and the IP addresses of these printers 12 (the main printer and sub-printers). The page information table 18 includes information of printing processes that is used in the printing switching process, for example, job IDs, the number of pages already printed, the number of printers, and the IP addresses of these printers, etc. The print status table 19 includes separate information for each print job. More specifically, this information contains identification information of a print server 11 (such as its IP address), the ID of the each print job (job ID), the number of pages already received, the number of pages already developed, the number of pages already outputted (for printing), a print execution status that indicates whether the printing process is suspended, etc. At least part of the information stored in these tables may be stored in, for example, the NV-RAM 12g. In the present embodiment, it is preferable to use, as a print status storing unit 16, the non-volatile magnetic disk device 12d, the non-volatile NV-RAM 12g, or other non-volatile storage devices. As shown in FIG. 5, in the present embodiment, a plurality of print status tables 19 are stored in the print status storing unit 16 of each of the printers 12. The print status table is provided for each print server 11 (server ID) or for each print job (job ID).

The print execution status is information indicating the printing condition of a printer 12. In the present embodiment, this information indicates one of at least "printing," "suspended," and "blocked." In the present embodiment, the "suspended" state means that although the printer 12 can execute a print job, it cannot receive the data for the print job due to, for example, a communication failure and the execution of the print job is suspended. The "blocked" state means that printing on the printer 12 is blocked, i.e., although the printer 12 has received the data for a print job, the execution of the printing process is blocked (the printer 12 is used as a stand-by printer). In the present embodiment, the print execution status corresponds to execution status identification information and process-suspended-device identification information.

Figure 6:
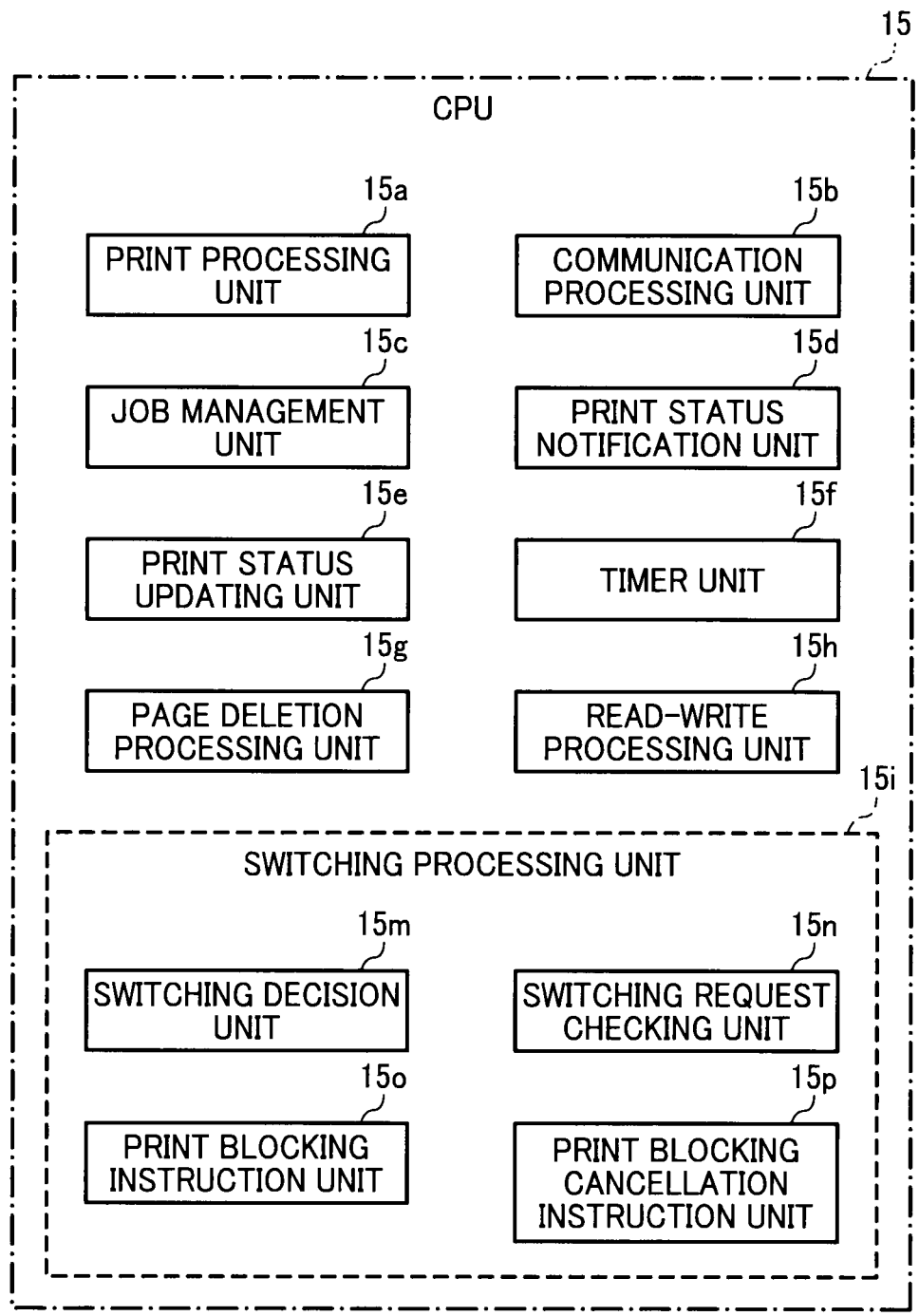
FIG. 6 is a block diagram illustrating an example of the CPU of the printing device.

In the present embodiment, when the CPU 15 executes an application program stored in the RAM 12e, it operates as a print processing unit 15a, a communication processing unit 15b, a job management unit 15c, a print status notification unit 15d, a print status updating unit 15e, a timer unit 15f, a page deletion processing unit 15g, a read-write processing unit 15h, a switching processing unit 15i, or other units, as shown in FIG. 6. The switching processing unit 15i includes a switching decision unit 15m, a switching request checking unit 15n, a print blocking instruction unit 15o, and a print blocking cancellation instruction unit 15p. More specifically, the program for the printer controller 12a includes modules for operating the CPU 15 as the print processing unit 15a, the communication processing unit 15b, the job management unit 15c, the print status notification unit 15d, the print status updating unit 15e, the timer unit 15f, the page deletion processing unit 15g, the read-write processing unit 15h, the switching processing unit 15i, the switching decision unit 15m, the switching request checking unit 15n, the print blocking instruction unit 15o, and the print blocking cancellation instruction unit 15p.

The print processing unit 15a controls the printer engine 12c based on a print job including print data and a processing request to execute the printing process.

The communication processing unit 15b manages communication of data etc. between internal units of the CPU 15 and between an internal unit of the CPU 15 and an external device.

Upon reception of a processing request for a print job (a device acquisition request) from a print server 11 (11A or 11B), the job management unit 15c refers to the print status recorded in the print status table 19 for this print job to determine whether the print job is to be executed on the printer 12. More specifically, when a print job suspended due to, for example, a communication failure is resumed, the job management unit 15c does not resume the execution of the print job (the remaining part of the print job) on the printer 12 if the print execution status is "blocked." The job management unit 15c resumes the execution of the print job (the remaining part of the print job) on the printer 12 only if the print execution status is "suspended."

If necessary, upon reception of a processing request for a print job (device acquisition request) from a print server 11 (11A or 11B), the print status notification unit 15d refers to the print status table 19 for this print job and sends a print status notification that indicates the print status to the print server 11 from which the processing request is sent.

The print status updating unit 15e monitors the printer 12 and updates a print status table 19, for example, when a request from a print server 11 (11A or 11B) is received, when detection results from, for example, a known sensor provided in the printer 12 are changed, when a notification indicating that a target page for each process is changed is received from the CPU 15 or other units, or at predetermined timing (for example, at a certain time interval or at predetermined monitoring timing). More specifically, the print status updating unit 15e updates, for example, the number of pages already received, the number of pages already developed, the number of pages already outputted, the print execution status, etc. In the present embodiment, the print status updating unit 15e corresponds to an information updating unit.

The switching processing unit 15i executes a process (printing switching process) for changing a print job execution assignment (also referred to as a printing right) so that the print job is executed on another printer 12. The switching decision unit 15m determines, according to, for example, the occurrence of an error in the printer 12, whether the job is to be assigned to another printer 12. The switching request checking unit 15n checks whether a switching request has been issued. If a switching request has been issued, the job assigned to the printer 12 is forced to be assigned to another printer 12. The print blocking instruction unit 15o instructs another printer (lower-level printer) 12 to block the execution of printing, and the print blocking cancellation instruction unit 15p instructs another printer (lower-level printer) 12 to cancel the blocking of printing. In the present embodiment, the print job execution assignment (printing right) is changed through the blocking of printing and the cancellation of the blocking of printing. The storage unit (such as the RAM 12e, the NV-RAM 12g, or the magnetic disk device 12d) of the printer 12 stores, as information indicating the job assignment (printing right), for example, information of print blocking (for example, printing blocked: 1, print blocking cancelled: 0).

The page deletion processing unit 15g executes a synchronization process for the print data (print job) held in the printer 12. The contents of the print data are stored in the page information table 18. The timer unit 15f measures, for example, the time periods for monitoring and updating the print status through the print status updating unit 15e.

The read-write processing unit 15h executes a process for writing data such as the print status onto the storage unit of the printer 12 and a process for reading data such as the print execution status from the storage unit of the printer 12. In the present embodiment, the read-write processing unit 15h corresponds to first and second storage processing units.

Operation of Printing System

Figures 7, 7A:
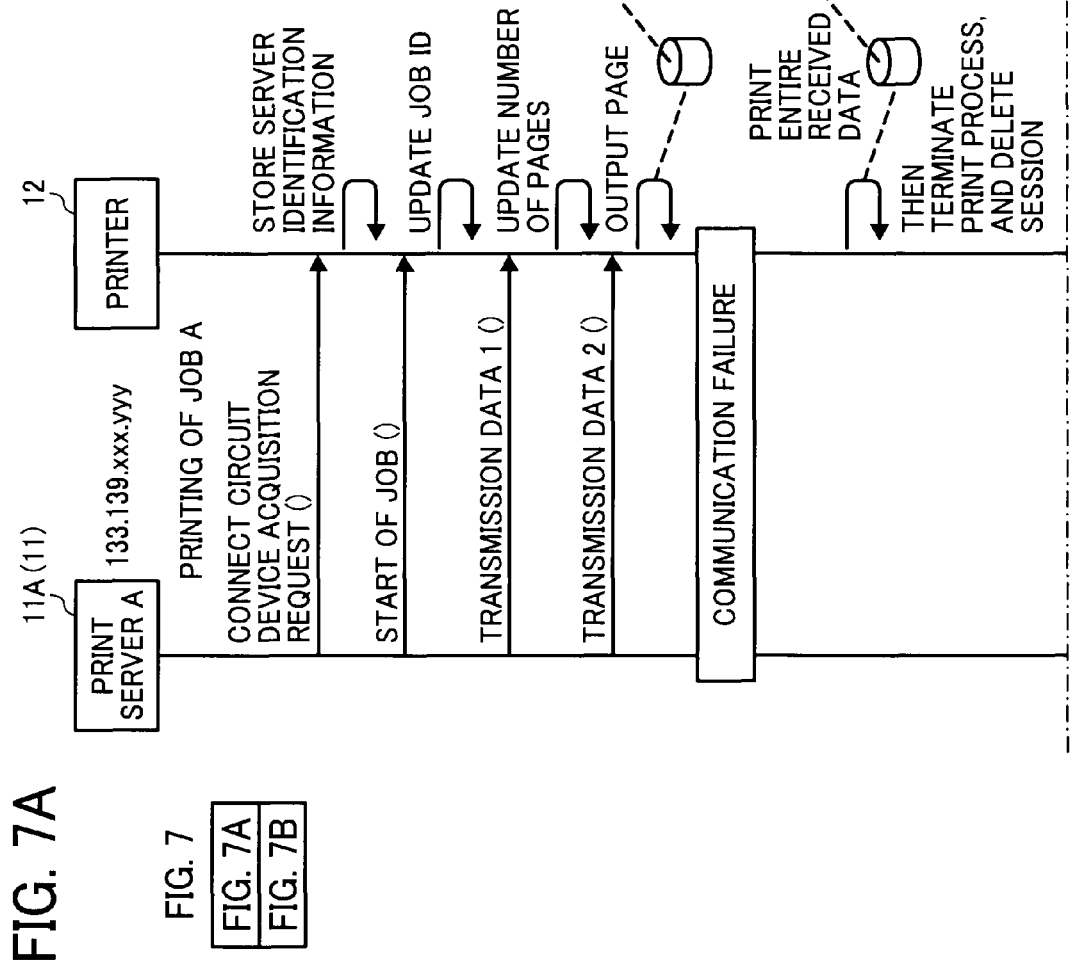
FIG. 7 is a sequence diagram showing an example of the procedure for executing a print job on the printing system according to a first embodiment of the present invention.
Figure 7B:
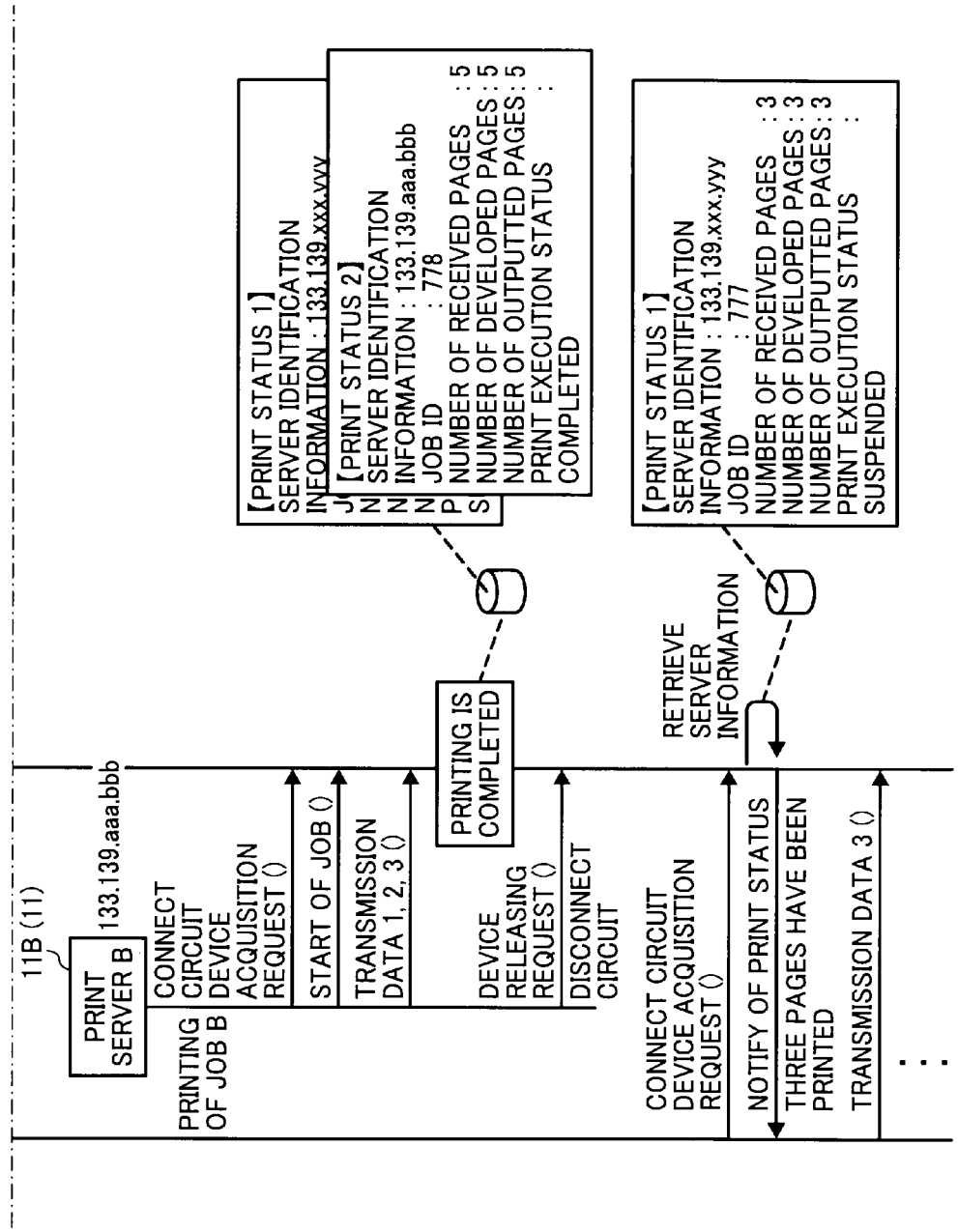

In an example shown in FIG. 7, print jobs sent from two print servers (11A and 11B) are executed on a group of a plurality of printers 12 such as a main printer and sub printers (the intranet 3 in FIG. 2) connected through a network. A breakdown of communication (communication failure) between the print server A (11A) and a particular printer 12 (normally the main printer) occurs during transmission of print data from the print server A (11A) to the printer 12, and accordingly, the transmission of the print data is not completed. In the present embodiment, the print server A (11A) and the print server (11B) may have the same device configuration.

As shown in FIG. 7, after a circuit is connected and a session is established, the print server A (11A) sends a device acquisition request for a print job A to the particular printer 12. Although not shown in the figure, in the printer group in the intranet 3 (see FIG. 2), any printer 12 that has received the device acquisition request sends the device acquisition request, connection data, a print blocking request, and other requests to a predetermined destination printer (next lower level printer 12). In each printer 12, data (such as the IP address of the printer 12) required for the device acquisition process and for job assignment is added to the connection data. Then a device acquisition response to the device acquisition request is transferred from the lowest level printer 12 to higher level printers 12. In this configuration, only the particular printer 12 that has first received the device acquisition request does not receive the print blocking request. The print job A is thereby assigned to the particular printer 12, and the plurality of printers 12 form a printer group that can support the switching process for the print job A.

Next, a job start request and print data for the print job A are sent from the print server A (11A) to the particular printer 12 (normally the main printer). When the particular printer 12 receives the device acquisition request or the job start request, the CPU 15 of the particular printer 12 functions as the print status updating unit 15e (see FIG. 6), and newly creates a print status table 19 for the print job A in the print status storing unit 16. During this process, the print execution status is set to "printing."

In this example, the print data for the print job A is sent from the print server A (11A) in a split form as transmission data 1, transmission data 2, etc. Each time the print data is received by the particular printer 12, developed, and outputted (outputted for printing) page-by-page, the CPU 15 of the particular printer 12 operates as the print status updating unit 15e (see FIG. 6) and updates the page information (the number of pages already received, the number of pages already developed, and the number of pages already outputted) in the print status table 19. The print status updating unit 15e can monitor and update the print status at, for example, constant time intervals irrespective of the timing of the changes in the status.

In the example shown in FIG. 7, a communication failure occurs, for example, between the print server A (11A) and the particular printer 12 after the transmission data 2 is transmitted. In this case, the particular printer 12 has received only first three pages of the print data for the print job A, and accordingly, cannot output the rest of pages. Therefore, the processing of the print job A from the print server A (11A) is suspended in the particular printer 12. However, the data that has already been received by the first printer 12 is processed and outputted. The CPU 15 of the particular printer 12 then operates as the print status updating unit 15e and changes the print execution status in the print status table 19 from "printing" to "suspended." The CPU 15 may discard the print data for the outputted pages. In this manner, the capacity of the print status storing unit 16 can be reduced.

In the example shown in FIG. 7, while the communication failure is still present between the print server A (11A) and the particular printer 12, the print server (11B) different from the print server A (11A) sends a processing request for a print job B (device acquisition request) to the particular printer 12. In this case, the CPU of the particular printer 12 operates as the job management unit 15c, and a determination is made as to whether the print job B from the print server B (11B) is to be executed. More specifically, the job management unit 15c checks the print status recorded in each print status table 19. If there is a print job (the print job A) from a print server (the print server A (11A)) different from the print server B but this print job is in a "suspended" state, a determination is made to execute the print job B from the print server B (11B). As in the case when the print job A is received, a job start request, transmission data 1, transmission data 2, etc. are sent from the print server B to the particular printer 12, and the print job B is completed on the particular printer 12. While the print job B is processed, the CPU 15 operates as the print status updating unit 15e and updates the print status table 19 for the print job B as needed.

When the communication failure between the print server A (11A) and the particular printer 12 is recovered, the print server A (11A) re-submits the processing request for the print job A (device acquisition request). Upon reception of this device acquisition request, the CPU 15 of the particular printer 12 operates as the print status notification unit 15d and sends, to the print server A (11A), a print status notification that indicates the current print status. In this manner, the print server A (11A) can obtain the print status in the particular printer 12 and can send more appropriate data. More specifically, if the print status notification indicates that the particular printer 12 has completed the processing of the transmission data 2 or first three pages have been outputted, the print server A (11A) sends the rest of print data, i.e., transmission data 3 and subsequent data sets or print data corresponding to page 4 and subsequent pages.

Figure 8:
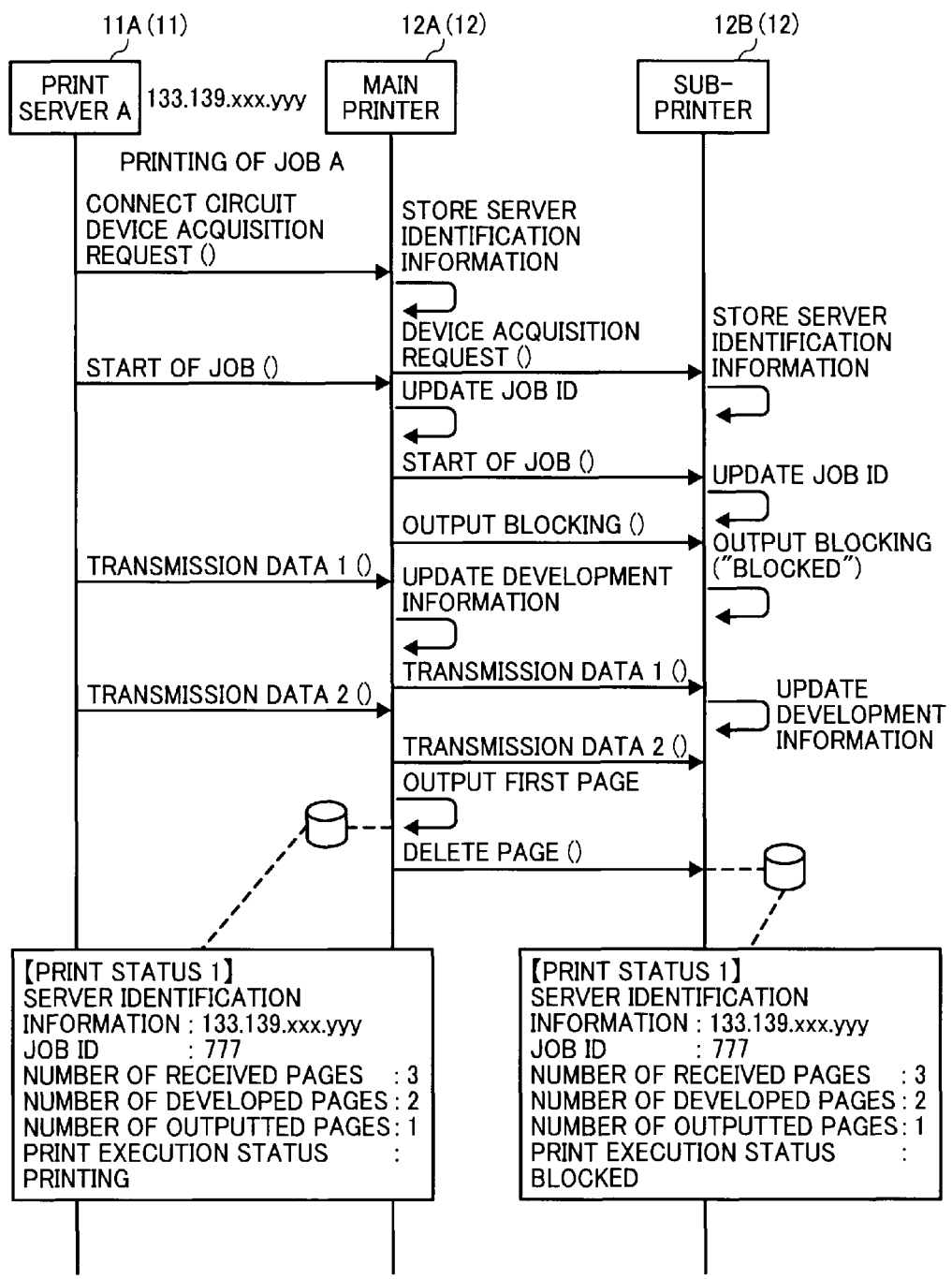
FIG. 8 is a sequence diagram showing another example of the procedure for executing a print job on the printing system according to the first embodiment of the present invention.

FIG. 8 is a sequence diagram showing an example of the operation of the printing system 1 including the print server A (11A) and two printers 12 (a main printer 12A and a sub-printer 12B) connected thereto. The "main" and "sub" merely represent the priority levels for print job assignment and do not mean structural differences.

One of the printers 12 in a group of electrically connected printers is used as the main printer 12A. A single printer may be always used as the sub-printer 12B, or the priority levels of the printers may be changed for different processes. The priority levels for job assignment can be given to the main printer 12A and the sub-printer 12B in the following manner. The IP address of a printer 12 to which the data is next transmitted is stored in the storage unit (such as the RAM 12e, the NV-RAM 12g, or the magnetic disk device 12d) of each of the printers 12, and the IP address stored is referred to when the data is transmitted. If a plurality of sub-printers 12B are connected, the priority levels can be set in a similar manner. More specifically, in the present embodiment, a plurality of printers 12 having functions of similar levels are electrically connected; where, for example, information indicating the priority level for job assignment is stored in each printer 12, thereby setting the priority levels of the plurality of printers 12. In this manner, a reliable printing system that can execute an alternative printing process can be configured.

Referring to FIG. 8, it can be understood that the commands, data, etc. sent from the print server A (11A) to the main printer 12A are also further sent to the sub-printer 12B via the main printer 12A. In the example shown in FIG. 8, the print job is assigned to the main printer 12A by the job management unit 15c of the main printer 12A, and the print job is executed on the main printer 12A. Therefore, an output blocking request is sent from the main printer 12A to the sub-printer 12B together with a job start request. The job management unit 15c of the sub-printer 12B thereby sets the print execution status to "blocked." After the main printer 12A outputs and prints pages, a page deletion request is sent from the main printer 12A to the sub-printer 12B. Then the print data for the pages that have been outputted on the main printer 12A is deleted from the storage unit of the sub-printer 12B.

Figure 9:
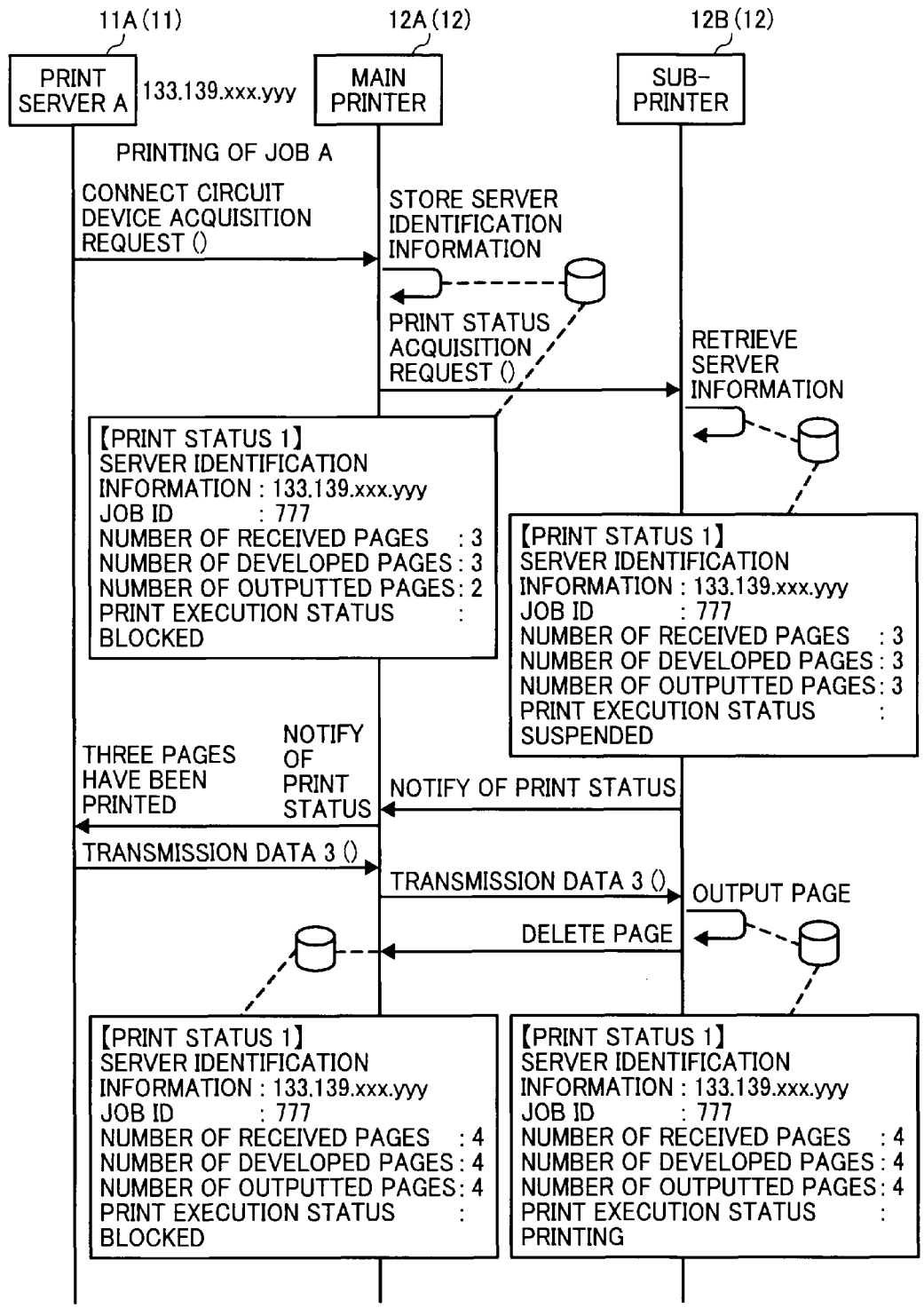
FIG. 9 is a sequence diagram showing still another example of the procedure for executing a print job on the printing system according to the first embodiment of the present invention.

In an example shown in FIG. 9, after the print server A (11A) submits a processing request for a print job, some problem (for example, out of paper) occurs, and the print job cannot be executed on the higher-level main printer 12A, or the print job once started on the main printer 12A cannot be continued. Then the print job is instead executed on the lower-level sub-printer 12B. In this case, the job management unit 15c of the main printer 12A does not assign the print job to the main printer 12A. Therefore, the print execution status of the main printer 12A is set to "blocked." The job management unit 15c of the sub-printer 12B does not receive an output blocking request from the main printer 12A or receives an output blocking cancellation request. Therefore, when the sub-printer 12B has no particular problem and can execute printing, the print job is assigned to the sub-printer 12B. The print execution status of the sub-printer 12B is thereby set to "printing."

In addition, in the example shown in FIG. 9, for example, a communication failure between the print server A (11A) and the sub-printer 12B occurs during execution of the print job on the sub-printer 12B, and the execution of the print job on the sub-printer 12B is suspended. In this case, the job management unit 15c of the sub-printer 12B changes its print execution status from "printing" to "suspended." However, the print execution status of the main printer 12A is not changed by the job management unit 15c of the main printer 12A and remains in the "blocked" state.

FIG. 9 is a sequence diagram showing a case where after the print job on the sub-printer 12B is suspended due to, for example, a communication failure, the main printer 12A receives a device acquisition request from the print server A (11A). In this case, a print status acquisition request is sent from the main printer 12A to the sub-printer 12B; and a print status notification, which is a response to the print status acquisition request, is sent from the sub-printer 12B to the main printer 12A. The data, such as the number of pages already developed and the number of pages already outputted, in the main printer 12A is thereby updated; and a print status notification is sent from the main printer 12A to the print server A (11A), which is the sender of the print status acquisition request. In this manner, the print server A (11A) can resume data transmission from the suspended page or the next page. Each time a page is outputted and printed by the sub-printer 12B, a page deletion request is sent from the sub-printer 12B to the main printer 12A (as a blocked printer), and the data for the printed page is deleted from the storage unit of the main printer 12A.

The rest of the print job is resumed by a printer 12 in which the print execution status of the print job is "suspended," i.e., on the sub-printer 12B in the example shown in FIG. 9. With the algorithm described above, in a printer 12 in which the execution of a print job is suspended due to a communication failure or other reasons, the print execution status of the print job is set to "suspended." In the other printers 12, the print execution statuses of the print job are set to "blocked." The job management unit 15c of each printer 12 is configured such that the print job is assigned to a particular printer 12 when the print execution status of the print job is "suspended." Although there are a plurality of printers 12, there is only one printer 12 in which the print execution status of the print job is "suspended," and therefore the rest of the print job can be resumed on the particular printer 12. In the example shown in FIG. 9, the print job is resumed on the sub-printer 12B. In this manner, when a print job executed on a printer 12 is suspended, the suspended job can be resumed on the same printer 12, and the rest of the pages can be outputted so as to be continuous with the last outputted page.

Figure 10:
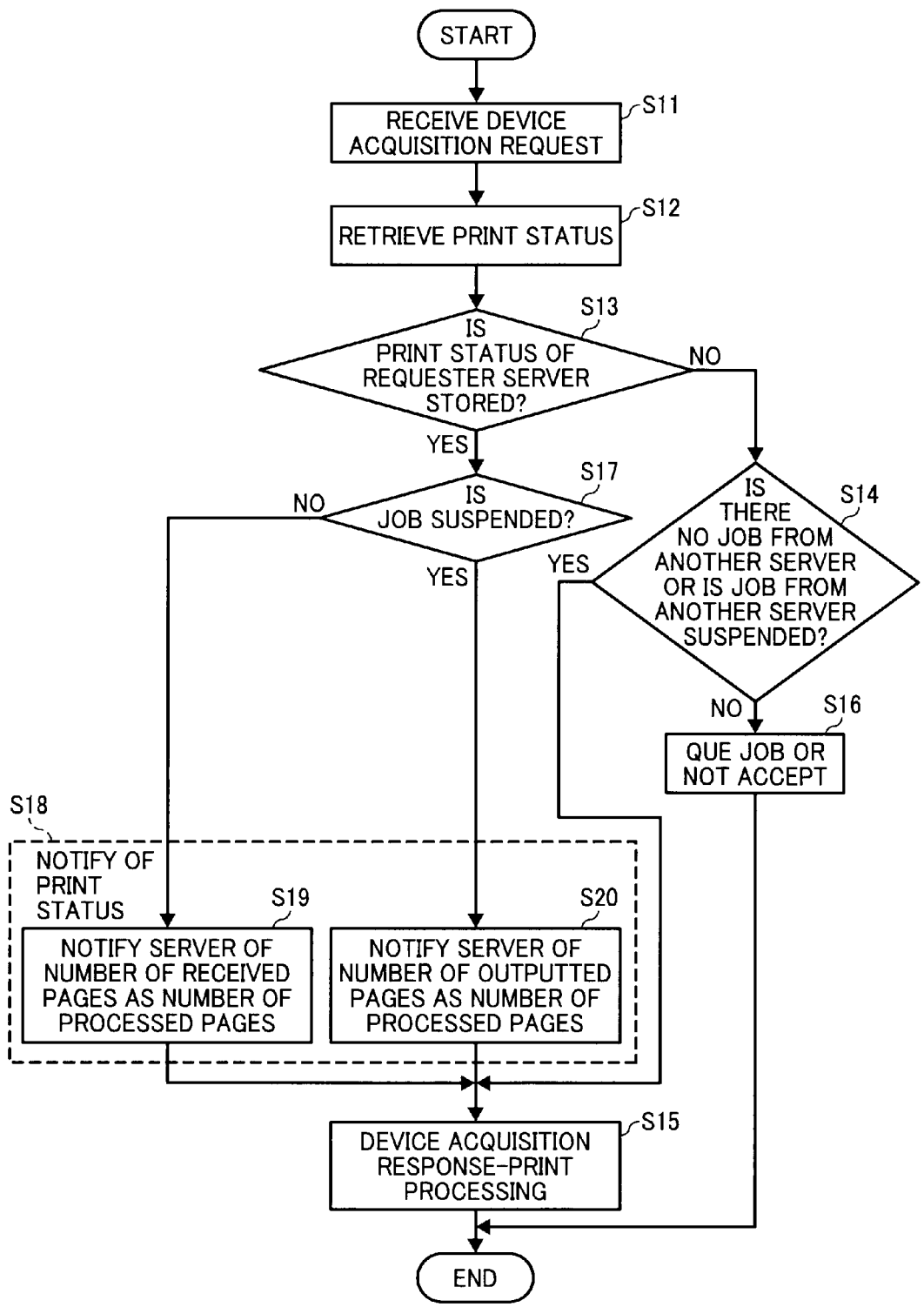
FIG. 10 is a flowchart showing an example of the procedure for managing print jobs, the procedure being executed on a printing device.

As shown in FIG. 9, in each printer 12, the print status table 19 is updated upon reception of the device acquisition request or the print status acquisition request. In each printer 12, the number of pages already received is updated each time data for one page is received from the print server 11 or a next higher level printer 12. In each printer 12, the number of pages already developed is updated each time the received data is developed into an image. In a printer 12 in which the printer execution status is "blocked," the number of pages already outputted is updated each time a page deletion request is received from another printer whose print execution status is "printing." If a printing process executed on a printer 12, in which the printer execution status is "printing," cannot be continued due to a problem such as out of paper or paper jamming, the rest of the print job is executed on any of the other printers 12. In this case, the print execution status of the printer 12 on which the rest of the print job is executed is changed from "blocked" to "printing," and the print execution status of the printer 12 on which the printing process cannot be continued is changed from "printing" to "blocked." The print execution status of a printer 12 can be set separately for two cases, i.e., when a print job is suspended due to a communication failure and when a problem occurs in the printer 12. Operation of Printer after Reception of Processing Request for Print Job As shown in FIG. 10, when the CPU 15 of a printer 12 receives a device acquisition request, which is a processing request for a print job (step S11), the CPU 15 operates as the job management unit 15c. More specifically, the CPU 15 searches each print status table 19 to determine whether there is an accepted (running or suspended) print job requested from the same print server 11 as the print server 11 that has submitted the device acquisition request (i.e., the sender of the device acquisition request) (step S12). If in step S12 the print status for the print server 11 that has submitted the device acquisition request is not recorded in any print status table 19, i.e., no print job from the print server 11 has been accepted (No in step S13), a determination is made as to whether there is no print job from another print server 11 or whether a print job from another print server 11 has been accepted but is suspended (step S14). If there is no print job from another print server 11 or there is a suspended print job from another print server (Yes in step S14), the CPU 15 that operates as the job management unit 15c determines that the print job from the requester print server 11 is executed. Then the CPU 15 submits a device acquisition response to the requester print server 11 and instructs the print processing unit 15a and other units to execute the print job from the requester print server 11 (step S15).

If in step S14 there is a print job from another print server 11 and this print job is being processed, the CPU 15 proceeds to step S16. In step S16, if possible, a queuing process is executed to receive and store the print data from the requester print server 11, or the print job is not accepted and a device acquisition response to the device acquisition request is not sent to the requester print server 11.

If in step S13 there is a stored print status for the requester print server 11, the CPU 15 operates as the print status notification unit 15d (step S18). However, different steps are performed depending on whether the print execution status of the print job from the print server 11 is not "suspended" (for example, "running" or "completed," No in step S17) or "suspended" (Yes in step S17). More specifically, in the former case (No in step S17), the print job is not suspended and will be further continued. Therefore, the CPU 15 that operates as the print status notification unit 15d refers to the print status table 19 and notifies the requester print server 11 of the "number of pages already received" as the "number of pages already processed" (step S19). In the latter case (Yes in step S17), the print job is resumed from the suspended state, and data that has not been received due to the suspension must be received. Therefore, the CPU 15 that operates as the print status notification unit 15d refers to the print status table 19 and notifies the requester print server 11 of the "number of pages already outputted" as the "number of pages already processed" (step S20). In the present embodiment, since the notification of the number of pages already processed is made in step S19 or step S20, the requester print server 11 can be prevented from sending useless print data to the printer 12, irrespective of whether the printing process is suspended or not. In step S19, the notification of the print status can be made after the print status is updated upon exchange of, for example, the print status acquisition request and the print status notification with other printers 12.

Next, after the notification of the print status is made in step S18, the CPU 15 operates as the job management unit 15c. More specifically, the CPU 15 sends a device acquisition response to the requester print server 11 and instructs the print processing unit 15a and other units to execute the print job from this print server 11 (step S15).

As described above, in the present embodiment, when the printing process for a print job received from one print server 11 is in a suspended state, the job management unit 15c accepts a processing request for a print job from another print server 11 and instructs the printer 12 to execute this print job. Therefore, the amount of useless suspended time of the printer 12 can be reduced, and print jobs can thereby be executed in an efficient manner.

In the present embodiment, the print status including the number of pages already received, the number of pages already outputted, and the print execution status (which is execution status identification information indicating at least whether the printing process is suspended or not) is stored in each print status table 19 in the print status storing unit 16. Therefore, when a suspended print job on a printer 12 is resumed, the unprinted part of the print data due to the suspension can be easily found, and this allows interruption of other print jobs during the suspension and resumption of the suspended print job in a smoother manner.

In the present embodiment, the print execution status of a printer 12 in which a printing process is suspended is set to "suspended." The print execution status of a printer 12 in which the printing process is not executed is set to "blocked" and unchanged. Therefore, the print execution status of a printer 12 can function as process-suspended-device identification information that can be used to determine whether the printing process is suspended on the printer 12 or not. The print status of a printer 12 in a suspended state can thereby be reliably obtained, and the suspended print job can be easily resumed in a smoother manner. Moreover, when a print job executed on a printer 12 is suspended and then resumed, the rest of the print job (printing of unprinted pages) is executed on the same printer 12. Therefore, the pages of a print job are prevented from being outputted from a plurality of printers 12 in a distributed manner.

In the present embodiment, each printer 12 has a print status notification unit 15d that sends the print status notification indicating the print status to a print server 11 in response to the request therefrom. Therefore, the print server 11 can know the data that has been sent to the printer 12, so that the print data is prevented from being sent from the print server 11 to the printer 12 in a redundant manner. The traffic on the telecommunication line between the print server 11 and the printer 12 can thereby be reduced, and the time required to send print data and therefore the processing time of the print job can be reduced.

In the present embodiment, when the print execution status is not "suspended," the print status notification unit 15d sends the number of pages already received as the number of processed pages. In the present embodiment, when the print execution status is "suspended," the print status notification unit 15d sends the number of pages already outputted as the number of processed pages. Therefore, the print data is sent from the print server 11 to the printer 12 according to the print status of the printer 12 and can be prevented from being sent in a redundant manner.

In the present embodiment, the print status storing unit 16 is a non-volatile storage device. Therefore, even when the supply of power to the printer 12 is stopped for some reason, the print status is prevented from being lost, and the effects of the present invention can be obtained in a more reliable manner.

In the present embodiment, each printer 12 has a print status updating unit 15e for successively updating the print status. Therefore, the print status can be kept up to date, and the effects of the present invention can be obtained in a more reliable manner.

Second Embodiment

In the present embodiment, each print server 11 serving as a host device adjusts print data to be sent to a printer 12 based on the print status.

Figure 11:
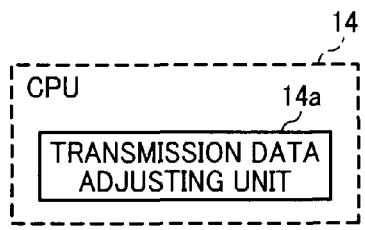
FIG. 11 is a block diagram illustrating an example of the CUP of a printing device according to a second embodiment of the present invention.

In the present embodiment, the CPU 14 of each print server 11 executes an application program stored in the RAM 11b and thereby operates as a transmission data adjusting unit 14a shown in FIG. 11. More specifically the program for the print server 11 includes a module for operating the CPU 14 as the transmission data adjusting unit 14a.

Figure 12:
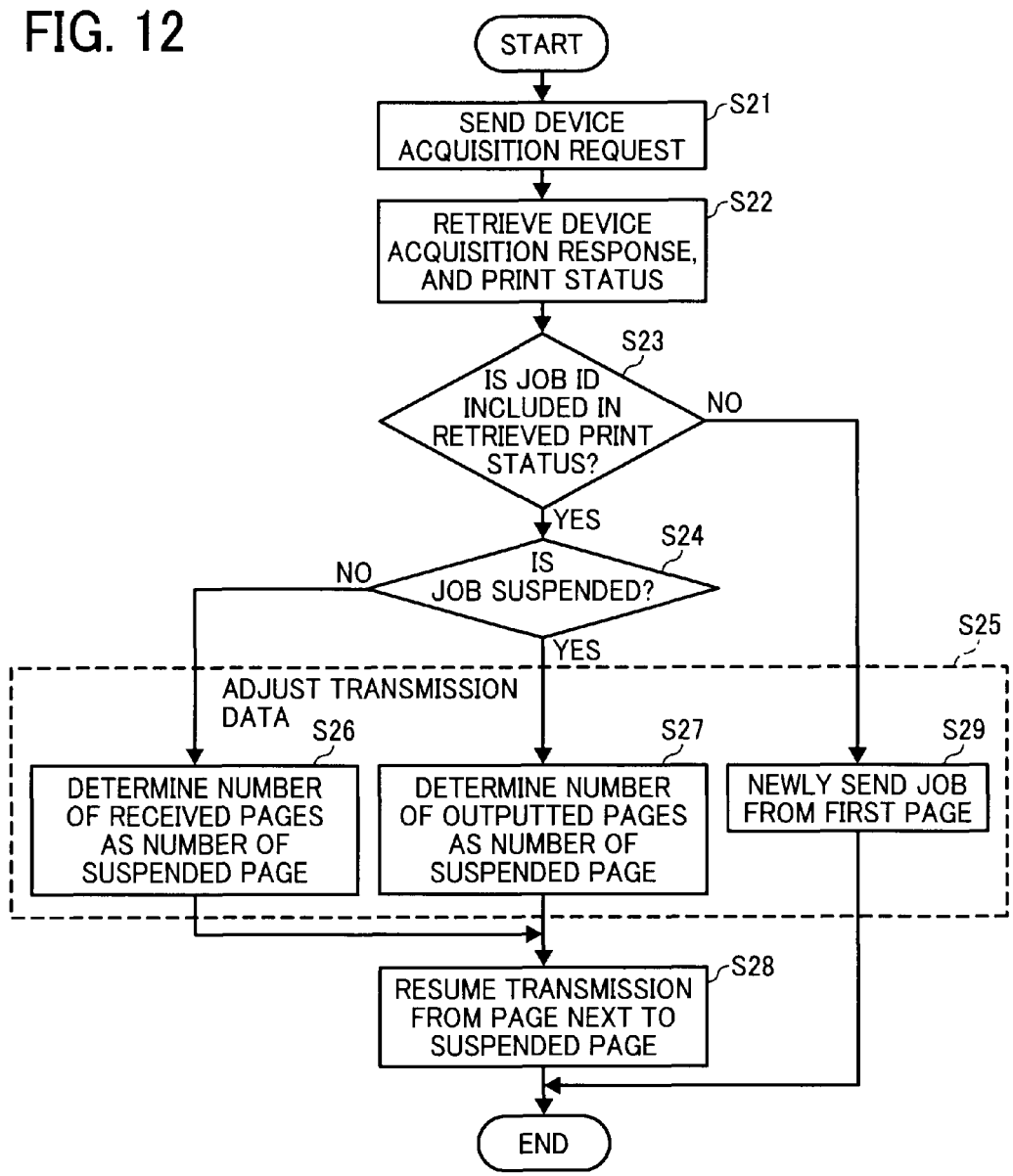
FIG. 12 is a flowchart showing an example of the procedure for resuming a suspended print job, the procedure being executed on a host device.

As shown in FIG. 12, the print server 11 sends a device acquisition request (step S21) to a printer 12 (main printer) and receives a device acquisition response to the device acquisition request and a print status notification from the printer 12 (step S22). Then the CPU 14 of the print server 11 operates as the transmission data adjusting unit 14a and determines whether the job ID of a print job corresponding to the processing request (device acquisition request) sent from the print server 11 is included in the print status contained in the received print status notification (step S23). If the job ID is included in the print status (Yes in step S23), the CPU 14 adjusts data to be transmitted (step S25). However, different steps are performed depending on whether the print execution status in the print status is not "suspended" (for example, "running" or "completed," No in step S24) or "suspended" (Yes in step S24). More specifically, in the former case (No in step S24), the print job is not suspended and will be further continued. Therefore, the CPU 14 that operates as the transmission data adjusting unit 14a refers to the print status and sets the "number of pages already received" as the "suspension page number" (step S26). In the latter case (Yes in step S24), the print job is resumed from the suspended state, and data that has not been received by the printer 12 due to the suspension must be sent. Therefore, the CPU 14 that operates as the transmission data adjusting unit 14a refers to the print status and sets the "number of pages already outputted" as the "suspension page number (step S27). To set the "suspension page number" means that information is written on a storage area for the "suspension page number" that is provided in a storage device such as the RAM 11b or the magnetic disk device 11g (preferably a non-volatile storage device). Then the CPU 14 sends the print data from the page next to the "suspended page" (step S28). When the job ID is not included in the print status in step S23, this print job is a new print job for the printer 12. Therefore, the CPU 14 sends the print data from the first page (step S29). With the processing described above, the print server 11 can be prevented from sending the print data to the printer 12 in a redundant manner.

In the above embodiment, each print server 11 has a transmission data adjusting unit 14a that adjusts the print data to be transmitted based on the print status. Therefore, the print server 11 can know the data that has been sent to a printer 12, so that the print data is prevented from being sent from the print server 11 to the printer 12 in a redundant manner. The traffic on the telecommunication line between the print server 11 and the printer 12 can thereby be reduced, and the time required to send print data and therefore the processing time of the print job can be reduced.

The preferred embodiments of the present invention have been described above, but the present invention is not limited to the preferred embodiments. Various modifications may be made to the preferred embodiments. For example, the present invention is applicable to a printing system to which three or more print servers are connected. When job assignment is changed and the printing process is executed on a sub-printer, the procedures described above are performed in a similar manner. The job switching processing is not limited to those in the preferred embodiments.

In the present invention, when a print job, which is sent from a host device and executed on a printing device, is suspended, a print job from another host device can be executed on that printing device. Therefore, the amount of useless suspended time of the printing device can be reduced, and print jobs can be executed in an efficient manner.

Accordingly, it is an object of the present invention to obtain a printing system that can process print jobs in a more efficient manner, a printing device, a program, and a storage medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system including a plurality of host devices and a plurality of printing devices which are connected via telecommunication lines, the printing system for executing a printing process for a print job sent from any one of the plurality of host devices on any one of the plurality of printing devices, the print job including print data and a processing command, the printing system comprising:
a storage unit;
a first storage processing unit for storing, in the storage unit, a print status of the print job, the print status including execution status identification information that indicates at least whether a printing process is suspended in the one printing device;
an information updating unit for monitoring the plurality of printing devices and updates the execution status identification information stored in the storage unit; and
a job management unit for determining, when a processing request for the print job sent from the one host device is received, based on the print status, whether the print job is to be executed on the one printing device, wherein:
when a processing request for the print job is sent from another host device while the printing process for the print job sent from the one host device is suspended in the one printing device, the job management unit allows the one printing device to execute the print job sent from the another host device, the storage unit includes a second storage processing unit for storing at least process-suspended-device identification information, the process-suspended-device identification information indicating the printing device having been used to execute the printing process for the print job that is suspended, while the printing process for the print job sent from the one host device is suspended in the one printing device, the job management unit receives the processing request for the print job from the another host device and allows the one printing device to execute the print job sent from the another host device, and when the job management unit receives a processing request for the suspended print job from the one host device after the print job sent from the another host device is completed in the one printing device, the job management unit allows the one printing device which has suspended the print job to execute the print job based on the process-suspended-device identification information.

2. The printing system according to claim 1, wherein each of the printing devices includes a print status notification unit for sending, in response to a request from any of the plurality of host devices, a print status notification indicating the print status to the host device.

3. The printing system according to claim 2, wherein:
the storage unit further stores a number of received pages as the print status; and
when the printing process for the print job is not suspended, the print status notification unit notifies the host device of the number of received pages as a number of having processed pages.

4. The printing system according to claim 2, wherein:
the storage unit further stores a number of outputted pages as the print status; and
when the printing process for the print job is suspended, the print status notification unit notifies the host device of the number of outputted pages as a number of having processed pages.

5. The printing system according to claim 2, wherein each of the host devices includes a transmission data adjusting unit for adjusting print data to be sent to the printing device based on the print status.

6. The printing system according to claim 1, wherein the storage unit is a non-volatile storage device.

7. The printing system according to claim 1, wherein the printing devices comprised: the first storage processing unit, the information updating unit, the job management unit, and a print processing unit for executing the print job.

* * * * *